(12) United States Patent
Zhu

(10) Patent No.: US 9,307,445 B2
(45) Date of Patent: Apr. 5, 2016

(54) APPARATUS AND METHOD FOR TRANSMITTING DATA PACKETS OF NODES IN WIRELESS SENSOR NETWORK

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Cheng-Fa Zhu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 37 days.

(21) Appl. No.: 14/486,408

(22) Filed: Sep. 15, 2014

(65) Prior Publication Data

US 2015/0282006 A1 Oct. 1, 2015

(30) Foreign Application Priority Data

Mar. 31, 2014 (CN) .......................... 2014 1 0126956

(51) Int. Cl.
*H04W 28/06* (2009.01)
*H04L 12/823* (2013.01)
*H04W 84/18* (2009.01)

(52) U.S. Cl.
CPC ............. *H04W 28/065* (2013.01); *H04L 47/32* (2013.01); *H04W 84/18* (2013.01)

(58) Field of Classification Search
None
See application file for complete search history.

(56) References Cited

U.S. PATENT DOCUMENTS

| 2007/0208535 | A1* | 9/2007 | Misra | ....................... H04Q 9/00 702/182 |
| 2007/0268127 | A1 | 11/2007 | Rittle et al. | |
| 2009/0265140 | A1 | 10/2009 | Murias et al. | |
| 2010/0275108 | A1 | 10/2010 | Sloan et al. | |
| 2014/0172310 | A1* | 6/2014 | Chin | ................... G06F 19/3406 702/19 |
| 2014/0359367 | A1* | 12/2014 | Friman | ................... G05B 9/02 714/37 |

* cited by examiner

*Primary Examiner* — Benjamin H Elliott, IV
(74) *Attorney, Agent, or Firm* — Novak Druce Connolly Bove + Quigg LLP

(57) ABSTRACT

An apparatus and method for transmitting a plurality of data packets of a plurality of nodes in a wireless sensor network. The plurality of data packets includes a plurality of original data values. The apparatus deleting the one of the plurality of original data values in accordance with a determination that an absolute difference between one of the plurality of original data values and a first preset value is smaller than a second preset value, or storing the one of the original data values in a database as an optimized data and setting the first preset value as the one of the original data values.

8 Claims, 5 Drawing Sheets

APPARATUS AND METHOD FOR TRANSMITTING DATA PACKETS OF NODES IN WIRELESS SENSOR NETWORK

FIELD

Embodiments of the present disclosure relate to data optimization.

BACKGROUND

A wireless sensor network has spatially distributed autonomous sensors to monitor physical or environmental conditions, such as temperature, sound, or pressure and pass their data packets of data through the network to a main location. In such a wireless sensor network, there are often many duplicate or unimportant data packets.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
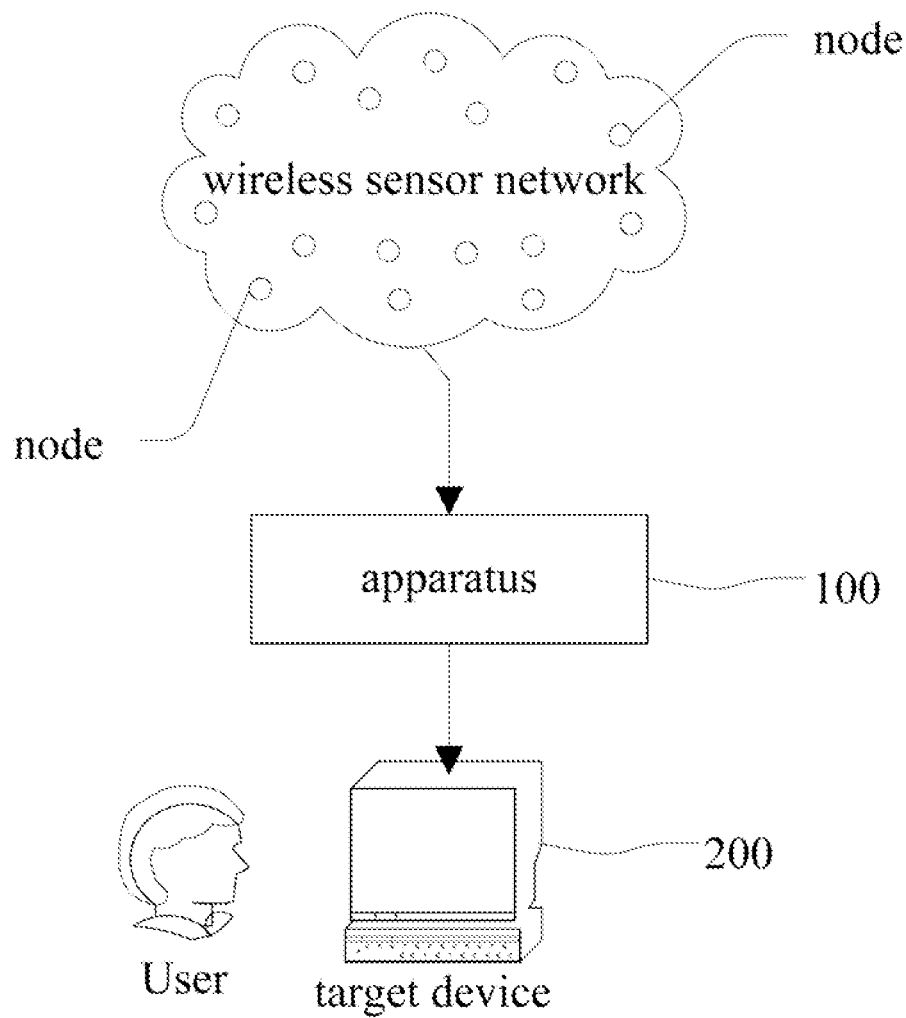
FIG. 1 illustrates an apparatus for transmitting data packets of one embodiment of the present disclosure.

FIG. 1 illustrates an apparatus 100 for transmitting data packets of one embodiment of the present disclosure. The apparatus 100 is applied to a wireless sensor network, the wireless sensor network consists of multiple sensors, the spatially distributed sensors constitute a reception range of a plurality of nodes, which monitor physical or environmental conditions, such as temperature, sound, and pressure and pass their data packets through the apparatus 100 to a target device 200.

Figure 2:
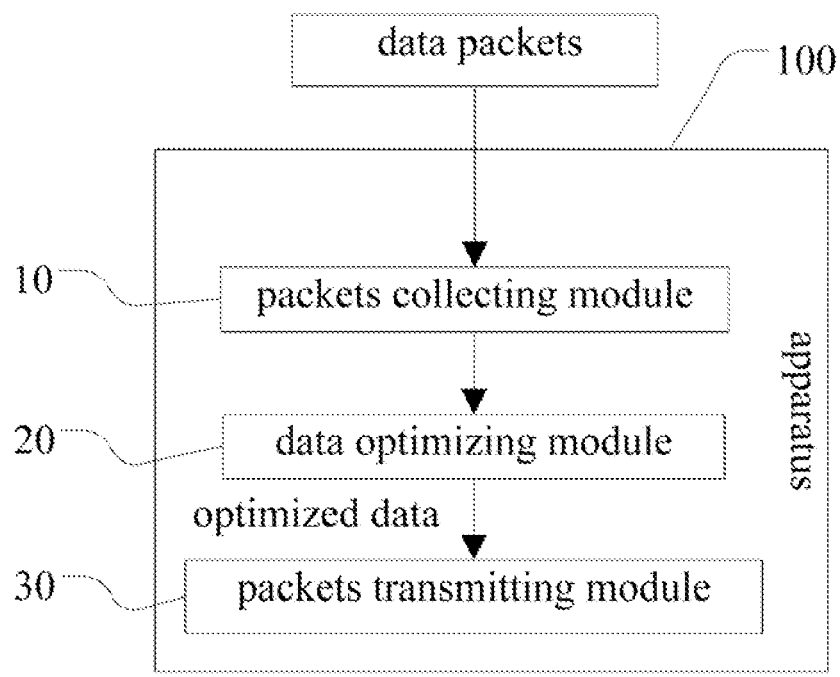
FIG. 2 is a schematic diagram of functional modules of the apparatus of one embodiment of the present disclosure.

FIG. 2 is a schematic diagram of functional modules of the apparatus 100 of one embodiment of the present disclosure. The apparatus 100 can comprise a processor and a storage system coupled to the processor, the storage system stores at least one software programs in the form of computerized codes operable to be executed by the processor. The software programs comprise a packets collecting module 10, a data optimizing module 20, and a packets transmitting module 30. The packets collecting module 10 receives the plurality of data packets of the plurality of nodes in a wireless sensor network, wherein the plurality of data packets contain data indicating current values of physical or environmental conditions such as temperature, sound, and pressure (hereinafter "original data values").

In accordance with a determination that an absolute difference between the original data values of one packet and a first preset value is less than a second preset value, the data optimizing module 20 deletes the packet.

In accordance with a determination that an absolute difference between the original data values of one packet and the first preset value is greater than or equal to the second preset value, the data optimizing module 20 stores the packet in a database as optimized data and uses the original data values received at first as the first preset value.

The data optimizing module 20 deletes or stores the next packet until all of the data packets are processed The packets transmitting module 30 transmits the data packets containing optimized data to the target device 200. The volume of the optimized data is less than the original data values, transmission of the data packets of optimized data through the apparatus 100 to the target device 200 is more efficient.

For example, the wireless sensor network consists of multiple temperature sensors which monitor environmental temperature, and pass their data packets of data to the apparatus 100. The packets collecting module 10 of the apparatus 100 receives the data packets, wherein the data packets comprise original temperature data representing 20 original temperature data values. The 20 original temperature data values are shown in the following table (the unit is degree Celsius):

| temperature | T1 | T2 | T3 | T4 | T5 | T6 | T7 | T8 | T9 | T10 |
|---|---|---|---|---|---|---|---|---|---|---|
| data value | 40.1 | 40.1 | 40.2 | 40.2 | 40.2 | 40.1 | 40.3 | 40.6 | 40.8 | 41 |
| temperature | T11 | T12 | T13 | T14 | T15 | T16 | T17 | T18 | T19 | T20 |
| data value | 41.1 | 41.1 | 41.2 | 41.1 | 41.2 | 40.6 | 40.5 | 40.6 | 40.5 | 40.6 |

The initial value of the first preset value is set to zero, the second preset value is set to 0.5 degree Celsius, the second preset value is set by the user according to actual needs.

The data optimizing module 20 receives the data T1 first, and determines whether absolute difference between T1 and the first preset value is less than the second preset value, the first preset value being zero and the second preset value being 0.5 degree Celsius. T1 is 40.1 degree Celsius, and the absolute difference between T1 and the first preset value is 40.1 degree Celsius, and this difference is greater than the second preset value which is 0.5 degree Celsius. Thus, the data optimizing module 20 stores T1 in the database as optimized data. Moreover, the data optimizing module 20 also sets the value of T1 as the first preset value in place of any prior first preset value.

The data optimizing module 20 receives T2 and determines whether absolute difference between T2 and the first preset value is less than the second preset value. The first preset value is 40.1 degree Celsius, the second preset value is 0.5 degree Celsius, and the T2 is 40.1 degree Celsius. A calculation for absolute difference purposes between T2 and the first preset value reveals zero (i.e. no difference), and this quantity is less than the second preset value which is 0.5 degree Celsius. Thus, the data optimizing module 20 deletes T2.

The data optimizing module 20 gets values T3-T20 sequentially until all of the 20 original temperature data values have been processed. After that, the following table when completed shows optimized data:

|  | T1 | T8 | T11 | T16 |
|---|---|---|---|---|
| optimized data | 40.1 | 40.6 | 41.1 | 40.6 |

In one embodiment, the data optimizing module 20 further comprises a counter that records the number of times that data packets containing original data values have been deleted, and the data optimizing module 20 also stores the number of deletions in the database as the optimized data.

For example, after the data optimizing module 20 has deleted T2, the counter records the number 1 and stores the number 1 as optimized data. Each time one packet is deleted, the counter adds the new number to the original number, and stores the result in the database as optimized data. The optimized data thus also consists of the (deletion) numbers shown in the following table:

|  |  | T1 | T8 | T11 | T16 |
|---|---|---|---|---|---|
| optimized data | temperature data value | 40.1 | 40.6 | 41.1 | 40.6 |
|  | number | 7 | 3 | 5 | 5 |

Figure 3:
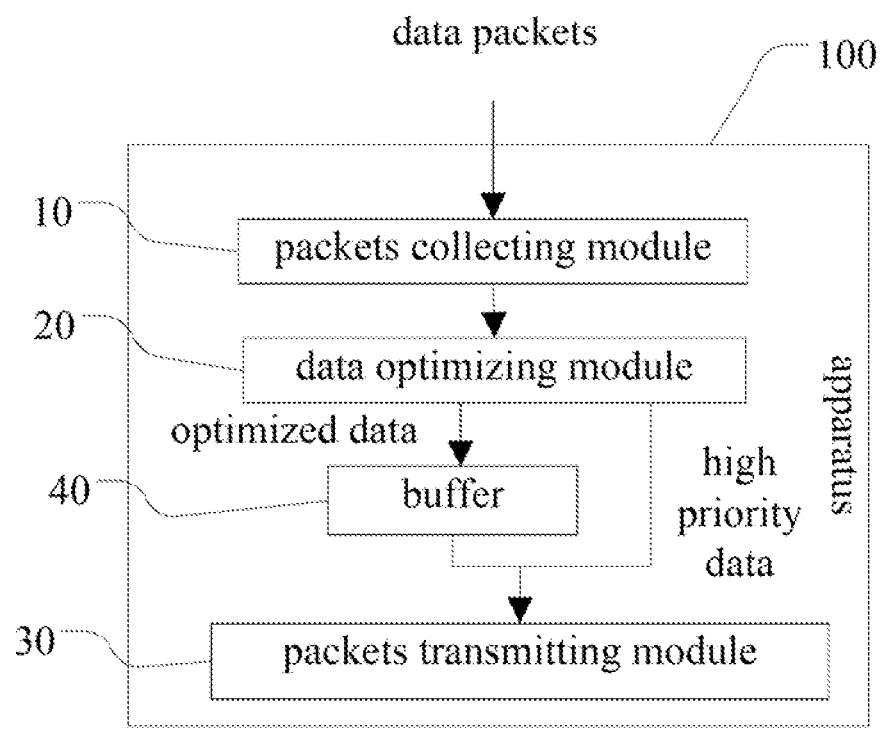
FIG. 3 is a schematic diagram of functional modules of the apparatus of another embodiment of the present disclosure.

FIG. 3 illustrates a schematic diagram of functional modules of the apparatus 100 of another embodiment of the present disclosure. The apparatus 100 further comprises a buffer 40 that stores the data packets of optimized data, the packets transmitting module 30 that sends the data packets of optimized data to the target device 200 when the occupancy rate of the buffer 40 reaches a preset value.

In one embodiment, before generating the optimized data, the data optimizing module 20 stores the original data values which are outside of the preset range in the database as high priority data when a determination has been made that one of the plurality of original data values is outside of a preset range. The data optimizing module 20 determines whether an original data value is outside the preset range, and stores such original data value as high priority data whenever an item of data is outside the preset range. The packets transmitting module 30 sends the high priority data to the target device 200 preferentially. In accordance with a determination that each of the plurality of original data values are inside of a preset range, determinations are made as to whether the absolute difference between an original data value and the first preset value is greater or less than the second preset value. Determinations as to whether an absolute difference between one of the plurality of original data values and the first preset value is greater or less than the second preset value only need to be carried out if a real difference exists.

For example, the preset range is 32-47 degree Celsius, when the packets collecting module 10 receives a packet containing T21 (60 degree Celsius), which is outside the preset range, the T21 will be seen as the high priority data, and needs to be sent to the target device 200 preferentially.

Figure 4:
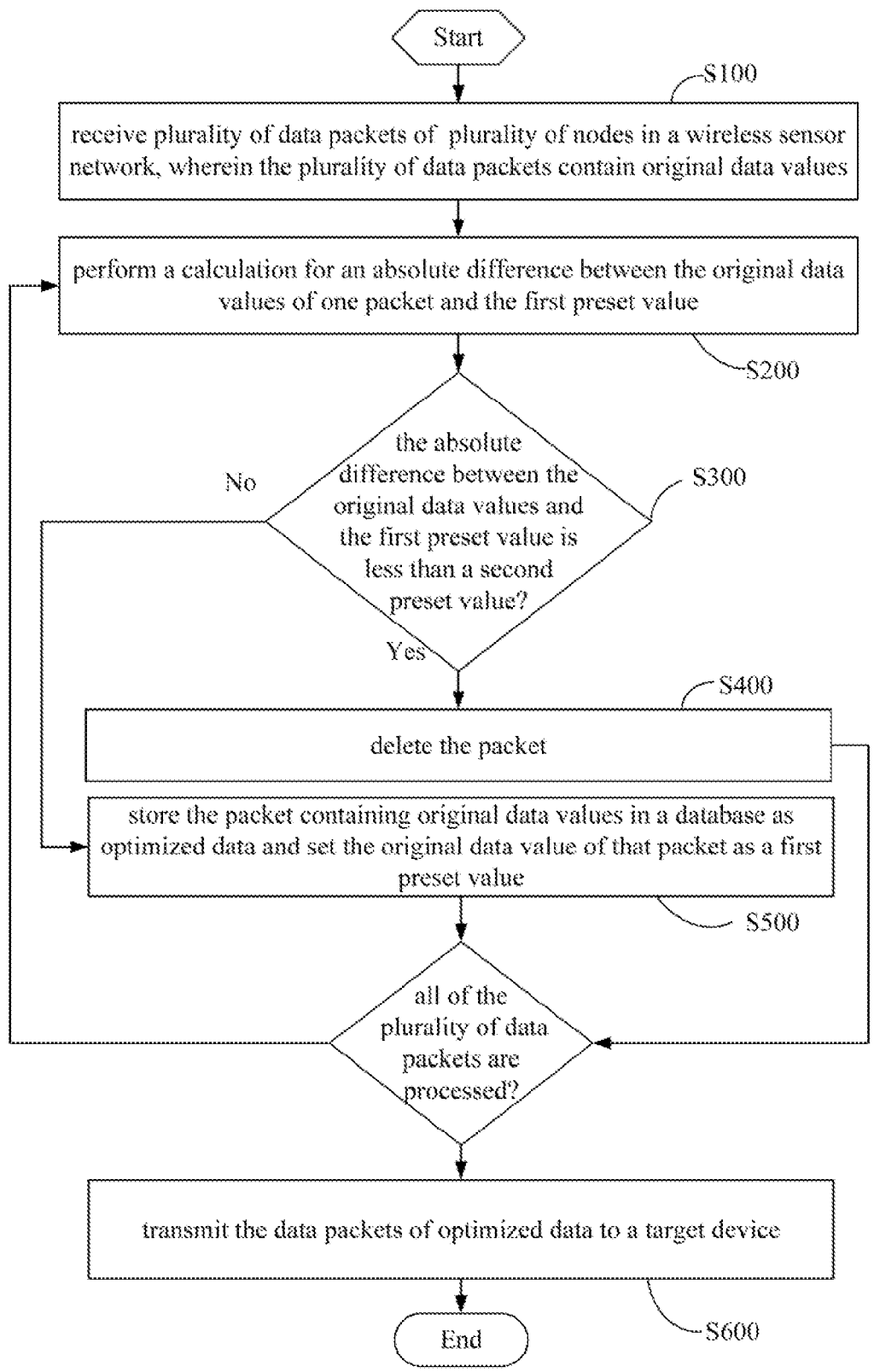
FIG. 4 shows a flowchart of a method for transmitting data packets of data according to an example of the present disclosure.

FIG. 4 shows a flowchart of a method for transmitting data packets of data according to an example of the present disclosure. The example method is provided by way of example, as there are a variety of ways to carry out the method. The method described below can be carried out using the configurations illustrated in FIG. 1 and FIG. 2, for example, and various elements of these figures are referenced in explaining the example method. Each block shown in FIG. 4 represents one or more processes, methods, or subroutines carried out in the example method. Furthermore, the illustrated order of blocks is illustrative only, and the order of the blocks can change according to the present disclosure. Additional blocks can be added or fewer blocks may be utilized, without departing from this disclosure. The example method can begin at block 100.

Firstly, in block 100, a packets collecting module of an apparatus receives the plurality of data packets of the plurality of nodes in the wireless sensor network, wherein the plurality of data packets contain data indicating current values of physical or environmental conditions such as temperature, sound, and pressure (hereinafter "original data values").

For example, the wireless sensor network consists of multiple temperature sensors which monitor environmental temperature, and pass their data packets to the apparatus. The packets collecting module of the apparatus receives the data packets, wherein the data packets comprise original temperature data representing 20 original temperature data values. The 20 original temperature data values are shown in the following table (the units is degree Celsius):

| temperature data value | T1 | T2 | T3 | T4 | T5 | T6 | T7 | T8 | T9 | T10 |
|---|---|---|---|---|---|---|---|---|---|---|
|  | 40.1 | 40.1 | 40.2 | 40.2 | 40.2 | 40.1 | 40.3 | 40.6 | 40.8 | 41 |
| temperature data value | T11 | T12 | T13 | T14 | T15 | T16 | T17 | T18 | T19 | T20 |
|  | 41.1 | 41.1 | 41.2 | 41.1 | 41.2 | 40.6 | 40.5 | 40.6 | 40.5 | 40.6 |

The initial value of the first preset value is set to zero, the second preset value is set to 0.5 degree Celsius, the second preset value being set by the user according to actual needs.

In block 200, a data optimizing module performs a calculation for an absolute difference between the original data values of one packet and the first preset value.

In block 300, the data optimizing module determines whether the absolute difference between the original data values of the packet and the first preset value is less than a second preset value.

In block 400, the data optimizing module deletes the packet in accordance with a determination that an absolute difference between an original data value in the packet and a first preset value is less than a second preset value.

In block 500, the data optimizing module stores the packet containing original data values in a database as optimized data and sets the original data value of that packet as a first preset value in accordance with a determination that an absolute difference between the original data value and the first preset value is not smaller than the second preset value.

After that, the data optimizing module deletes or stores the next packet containing original data values until all of the plurality of data packets are processed.

The data optimizing module receives the data T1 first, and determines whether an absolute difference between T1 and the first preset value is less than the second preset value. The first preset value is zero, the second preset value is 0.5 degree Celsius, and the T1 is 40.1 degree Celsius. The absolute difference between T1 and the first preset value is 40.1 degree Celsius, and this difference is greater than the second preset value which is 0.5 degree Celsius. Thus, the data optimizing module stores T1 in the database as optimized data. Moreover, the data optimizing module also appoints a value of 40.1 degree Celsius (the value of T1) to the first preset value simultaneously, the first preset value then becomes 40.1 degree Celsius.

The data optimizing module receives T2 and determines whether any absolute difference between T2 and the first preset value is less than the second preset value. The first preset value is 40.1 degree Celsius, the second preset value is 0.5 degree Celsius, and the T2 is 40.1 degree Celsius. There is no difference between T2 and the first preset value (i.e. the absolute difference is zero), and it is less than the second preset value which is 0.5 degree Celsius. Thus, the data optimizing module deletes T2.

The data optimizing module receives T3-T20 sequentially until all of the data packets contains 20 original temperature data values are processed. After that, the completed optimized data values are shown in the following table:

|  | T1 | T8 | T11 | T16 |
|---|---|---|---|---|
| optimized data | 40.1 | 40.6 | 41.1 | 40.6 |

In block 600, a packets transmitting module transmits the data packets of optimized data to a target device. The volume of the optimized data is less than the original data values, transmission of the data packets of optimized data through the apparatus to the target device is more efficient.

Figure 5:
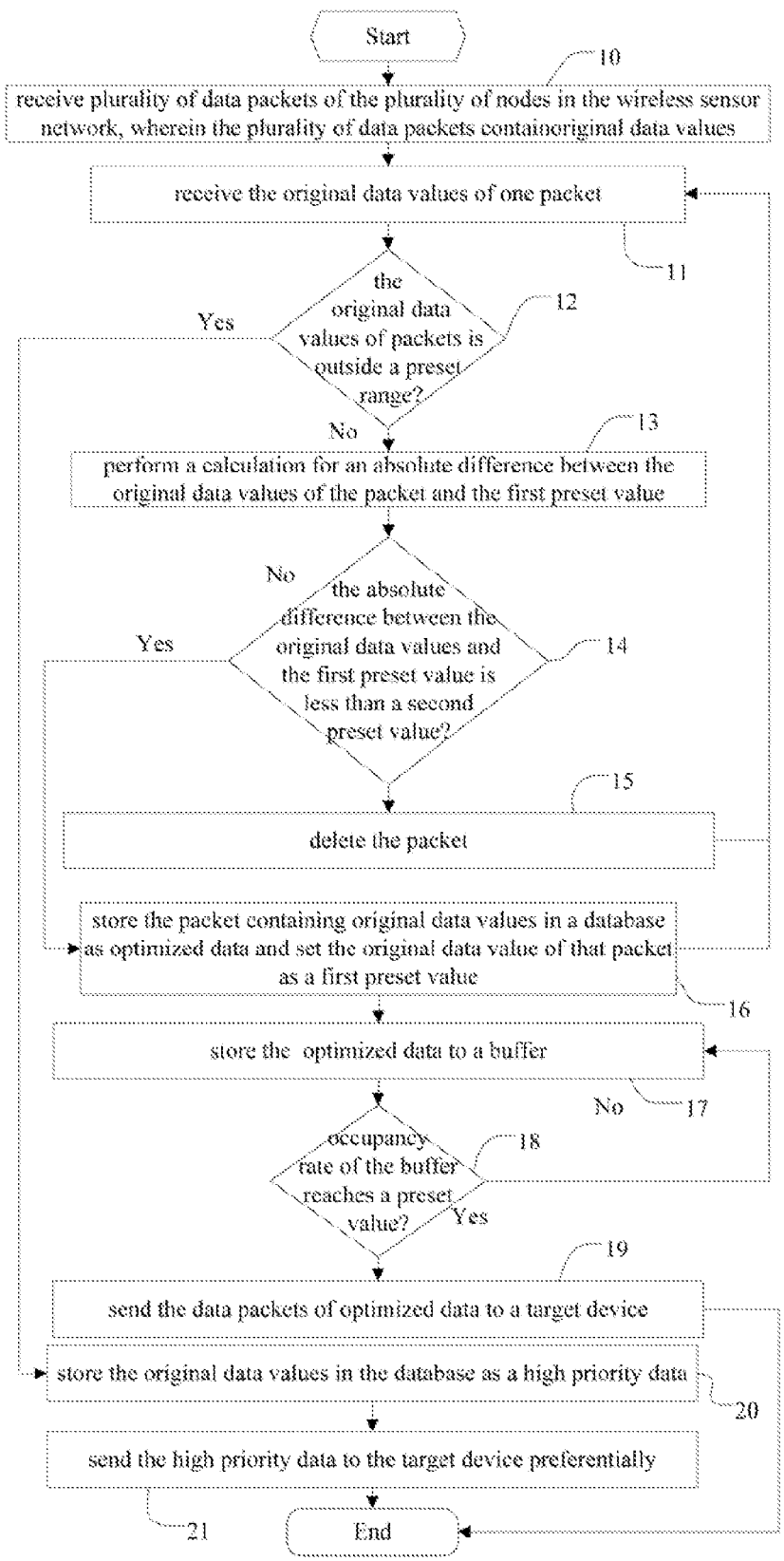
FIG. 5 shows a flowchart of a method of another example of the present disclosure.

FIG. 5 shows a schematic flowchart of a method of another example of the present disclosure. The example method is provided by way of example, as there are a variety of ways to carry out the method. The method described below can be carried out using the configurations illustrated in FIG. 1 and FIG. 3, for example, and various elements of these figures are referenced in explaining the example method. Each block shown in FIG. 5 represents one or more processes, methods, or subroutines carried out in the example method. Furthermore, the illustrated order of blocks is illustrative only, and the order of the blocks can change according to the present disclosure. Additional blocks can be added or fewer blocks may be utilized, without departing from this disclosure. The example method can begin at block 10.

Firstly, in block 10, a packets collecting module of apparatus receives the plurality of data packets of the plurality of nodes in the wireless sensor network, wherein the plurality of data packets contain data indicating current values of physical or environmental conditions such as temperature, sound, and pressure (hereinafter "original data values").

For example, the wireless sensor network consists of multiple temperature sensors which monitor environmental temperature, and pass their data packets to the apparatus. The packets collecting module of the apparatus receives the data packets, wherein the data packets comprise original temperature data representing 20 original temperature data values. The 20 original temperature data values are shown in the following table (the units is degree Celsius):

The initial value of the first preset value is set to zero, the second preset value is set to 0.5 degree Celsius, the second preset value being set by user according to actual needs.

In block 11, the data optimizing module receives the original data values of one packet.

In block 12, the data optimizing module determines whether the original data values of the packet is outside of the preset range.

In block 13, the data optimizing module performs a calculation for an absolute difference between the original data values of the packet and the first preset value in accordance with a determination that the original data values being inside of the preset range.

In block 14, the data optimizing module determines whether the absolute difference between the original data values of the packet and the first preset value is less than a second preset value.

In block 15, the data optimizing module deletes the packet in accordance with a determination that an absolute difference between an original data value of the packet and a first preset value is less than the second preset value.

In block 16, the data optimizing module stores the packet containing original data values in a database as an optimized data and sets the original data value of that packet as a first preset value in accordance with a determination that an absolute difference between the original data values and the first preset value is greater than the second preset value.

After that, the data optimizing module deletes or stores the next packet containing original data values until all of the plurality of data packets are processed.

The data optimizing module receives the data T1 first, and determines whether an absolute difference between T1 and the first preset value is less than the second preset value. The first preset value is zero, the second preset value is 0.5 degree Celsius, and the T1 is 40.1 degree Celsius. The absolute difference between T1 and the first preset value is 40.1 degree Celsius, and this difference is greater than the second preset value which is 0.5 degree Celsius. Thus, the data optimizing module stores T1 in the database as optimized data. Moreover, the data optimizing module also appoints a value of 40.1 degree Celsius (the value of T1) to the first preset value simultaneously, the first preset value then becoming 40.1 degree Celsius.

The data optimizing module receives T2 and determines whether any absolute difference between T2 and the first preset value is less than the second preset value. The first preset value is 40.1 degree Celsius, the second preset value is 0.5 degree Celsius, and the T2 is 40.1 degree Celsius. There is no difference between T2 and the first preset value (i.e. the absolute difference is zero), and it is smaller than the second preset value which is 0.5 degree Celsius. Thus, the data optimizing module deletes T2.

The data optimizing module receives T3-T20 sequentially until all of the data packets contain 20 original temperature data values are processed. After that, the completed optimized data values are shown in the following table:

| DATA PACKETS | T1 | T2 | T3 | T4 | T5 | T6 | T7 | T8 | T9 | T10 |
|---|---|---|---|---|---|---|---|---|---|---|
|  | 40.1 | 40.1 | 40.2 | 40.2 | 40.2 | 40.1 | 40.3 | 40.6 | 40.8 | 41 |
| DATA PACKETS | T11 | T12 | T13 | T14 | T15 | T16 | T17 | T18 | T19 | T20 |
|  | 41.1 | 41.1 | 41.2 | 41.1 | 41.2 | 40.6 | 40.5 | 40.6 | 40.5 | 40.6 |

|  | T1 | T8 | T11 | T16 |
|---|---|---|---|---|
| optimized data | 40.1 | 40.6 | 41.1 | 40.6 |

In block 17, the data optimizing module stores the optimized data to a buffer.

In block 18, the data optimizing module determines whether an occupancy rate of the buffer reaches a preset value.

In block 19, a packets transmitting module sends the data packets of optimized data to a target device when the occupancy rate of the buffer reaches the preset value.

In block 20, the packets transmitting module stores the original data values in the database as a high priority data in accordance with a determination that the original data values being outside of the preset range.

In block 21, the packets transmitting module sends the high priority data to the target device preferentially In accordance with a determination that each of the plurality of original data values are inside of a preset range, determinations are made as to whether the absolute difference between an original data value and the first preset value is greater or less than the second preset value. Determinations as to whether an absolute difference between one of the plurality of original data values and the first preset value is greater or less than the second preset value only need to be carried out if a real difference exists.

For example, the preset range is 32-47 degree Celsius, when the packets collecting module 10 receives a packet containing T21 (60 degree Celsius), which is outside the preset range, the T21 will be seen as the high priority data, and needs to be sent to the target device preferentially.

Therefore, under the apparatus and the method of the present disclosure, The volume of the optimized data is smaller than the original data values, transmission of the data packets of optimized data through the apparatus to the target device is more efficient.

While various embodiments of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. An apparatus for transmitting a plurality of data packets of a plurality of nodes in a wireless sensor network, the apparatus comprising:
   a processor; and
   a storage system coupled to the processor, storing at least one program in form of computerized codes operable to be executed by the processor, the program comprising instructions for:
   receiving the plurality of data packets of the plurality of nodes in the wireless sensor network, wherein the plurality of data packets contain an original data value;
   upon determining that an absolute difference between the original data values of one packet and a first preset value is less than a second preset value, deleting the packet;
   upon determining that an absolute difference between the original data values of one packet and the first preset value is not less than the second preset value, storing the packet in a database as an optimized data and using the original data values received at first as the first preset value;
   deleting or storing the next packet until all of the data packets are processed; and
   transmitting the data packets containing the optimized data to a target device.

2. The apparatus of claim 1, wherein the program further comprise instructions for:
   recording the number of times that data packets containing the original data values have been deleted; and
   storing the number of deletions in the database as optimized data.

3. The apparatus of claim 2, wherein, before generating the optimized data, the programs further comprise instructions for:
   upon determining that the original data values of one packet being outside of a preset range, storing the packet which are outside of the preset range in the database as high priority data; and
   sending the high priority data to the target device preferentially.

4. The apparatus of claim 3, wherein, the programs further comprise instructions for:
   upon determining that the original data values being inside of the preset range, determining whether the absolute difference between the plurality of original data values and the first preset value is smaller than the second preset value.

5. A method for transmitting a plurality of data packets of a plurality of nodes in a wireless sensor network, comprising:
   receiving the plurality of data packets of the plurality of nodes in the wireless sensor network, wherein the plurality of data packets contain an original data value;
   upon determining that an absolute difference between the original data values of one packet and a first preset value is less than a second preset value, deleting the packet;
   upon determining that an absolute difference between the original data values of one packet and the first preset value is not less than the second preset value, storing the packet in a database as an optimized data and using the original data values received at first as the first preset value;
   deleting or storing the next packet until all of the data packets are processed; and
   transmitting the data packets containing the optimized data to a target device.

6. The method of claim 5, further comprising:
   recording the number of times that data packets containing the original data values have been deleted; and
   storing the number of deletions in the database as optimized data.

7. The method of claim 6, wherein, before generating the optimized data, also comprising:
   upon determining that the original data values of one packet being outside of a preset range, storing the packet which are outside of the preset range in the database as high priority data; and
   sending the high priority data to the target device preferentially.

8. The method of claim 7, also comprising:
   upon determining that the original data values being inside of the preset range, determining whether the absolute difference between the plurality of original data values and the first preset value is smaller than the second preset value.

* * * * *